United States Patent [19]

Poole

[11] 3,922,643

[45] Nov. 25, 1975

[54] MEMORY AND MEMORY ADDRESSING SYSTEM

[75] Inventor: Margaret A. Poole, Wayland, Mass.

[73] Assignee: GTE Sylvania Incorporated, Stamford, Conn.

[22] Filed: Sept. 4, 1974

[21] Appl. No.: 502,934

[52] U.S. Cl. .............................................. 340/172.5
[51] Int. Cl. .............................................. G11C 7/00
[58] Field of Search ............... 340/172.5; 179/18 ES

[56] References Cited

UNITED STATES PATENTS

| | | | |
|---|---|---|---|
| 3,366,927 | 1/1968 | Falkoff | 340/172.5 |
| 3,394,354 | 7/1968 | Senzig | 340/172.5 |
| 3,629,857 | 12/1971 | Faber | 340/172.5 |
| 3,763,472 | 10/1973 | Sharp | 340/172.5 |
| 3,806,880 | 4/1974 | Spence | 340/172.5 |

*Primary Examiner*—Harvey E. Springborn
*Assistant Examiner*—Paul R. Woods
*Attorney, Agent, or Firm*—David M. Keay; Elmer J. Nealon; Norman J. O'Malley

[57] ABSTRACT

Memory system employed in a time compression scanner for monitoring telephone lines. Digital samples are written into the storage locations of a memory during one memory addressing period, and these samples are read out during the next memory addressing period, but in a different order from the order in which they were entered. As each sample is read out, it is replaced by a new sample which is to be read out during the subsequent memory addressing period. The memory address for writing in and reading out each sample is controlled by a series of flip-flops. Clock pulses are directed to a different one of the flip-flops during each memory addressing period in a recurring sequence of addressing periods in order to cause the storage locations to be addressed in a different order during each memory addressing period.

5 Claims, 15 Drawing Figures

| ADDRESS PERIOD | | | | 1 | | 2 | | 3 | | 4 | |
|---|---|---|---|---|---|---|---|---|---|---|---|
| CLOCK PULSES TO | | | | FF A | | FF D | | FF C | | FF B | |
| | | | | ADDRESS | | ADDRESS | | ADDRESS | | ADDRESS | |
| WRITE IN | | READ OUT | | FF STATES ABCD | DEC. EQUIV. | FF STATES ABCD | DEC. EQUIV. | FF STATES ABCD | DEC. EQUIV. | FF STATES ABCD | DEC. EQUIV. |
| SET | WORD | SET | WORD | | | | | | | | |
| 1 | 1 | 1 | 1 | 0000 | 0 | 0000 | 0 | 0000 | 0 | 0000 | 0 |
| 2 | 1 | 1 | 2 | 1000 | 1 | 0001 | 8 | 0010 | 4 | 0100 | 2 |
| 3 | 1 | 2 | 1 | 0100 | 2 | 1000 | 1 | 0001 | 8 | 0010 | 4 |
| 4 | 1 | 2 | 2 | 1100 | 3 | 1001 | 9 | 0011 | 12 | 0110 | 6 |
| 5 | 1 | 3 | 1 | 0010 | 4 | 0100 | 2 | 1000 | 1 | 0001 | 8 |
| 6 | 1 | 3 | 2 | 1010 | 5 | 0101 | 10 | 1010 | 5 | 0101 | 10 |
| 7 | 1 | 4 | 1 | 0110 | 6 | 1100 | 3 | 1001 | 9 | 0011 | 12 |
| 8 | 1 | 4 | 2 | 1110 | 7 | 1101 | 11 | 1011 | 13 | 0111 | 14 |
| 1 | 2 | 5 | 1 | 0001 | 8 | 0010 | 4 | 0100 | 2 | 1000 | 1 |
| 2 | 2 | 5 | 2 | 1001 | 9 | 0011 | 12 | 0110 | 6 | 1100 | 3 |
| 3 | 2 | 6 | 1 | 0101 | 10 | 1010 | 5 | 0101 | 10 | 1010 | 5 |
| 4 | 2 | 6 | 2 | 1101 | 11 | 1011 | 13 | 0111 | 14 | 1110 | 7 |
| 5 | 2 | 7 | 1 | 0011 | 12 | 0110 | 6 | 1100 | 3 | 1001 | 9 |
| 6 | 2 | 7 | 2 | 1011 | 13 | 0111 | 14 | 1110 | 7 | 1101 | 11 |
| 7 | 2 | 8 | 1 | 0111 | 14 | 1110 | 7 | 1101 | 11 | 1011 | 13 |
| 8 | 2 | 8 | 2 | 1111 | 15 | 1111 | 15 | 1111 | 15 | 1111 | 15 |

FIG. 9

| ADDRESS PERIOD | | | | 1 | | 2 | |
|---|---|---|---|---|---|---|---|
| CLOCK PULSES TO | | | | FF A | | FF C | |
| | | | | ADDRESS | | ADDRESS | |
| WRITE IN | | READ OUT | | FF STATES ABCD | DEC. EQUIV. | FF STATES ABCD | DEC. EQUIV. |
| SET | WORD | SET | WORD | | | | |
| 1 | 1 | 1 | 1 | 0000 | 0 | 0000 | 0 |
| 2 | 1 | 1 | 2 | 1000 | 1 | 0010 | 4 |
| 3 | 1 | 1 | 3 | 0100 | 2 | 0001 | 8 |
| 4 | 1 | 1 | 4 | 1100 | 3 | 0011 | 12 |
| 1 | 2 | 2 | 1 | 0010 | 4 | 1000 | 1 |
| 2 | 2 | 2 | 2 | 1010 | 5 | 1010 | 5 |
| 3 | 2 | 2 | 3 | 0110 | 6 | 1001 | 9 |
| 4 | 2 | 2 | 4 | 1110 | 7 | 1011 | 13 |
| 1 | 3 | 3 | 1 | 0001 | 8 | 0100 | 2 |
| 2 | 3 | 3 | 2 | 1001 | 9 | 0110 | 6 |
| 3 | 3 | 3 | 3 | 0101 | 10 | 0101 | 10 |
| 4 | 3 | 3 | 4 | 1101 | 11 | 0111 | 14 |
| 1 | 4 | 4 | 1 | 0011 | 12 | 1100 | 3 |
| 2 | 4 | 4 | 2 | 1011 | 13 | 1110 | 7 |
| 3 | 4 | 4 | 3 | 0111 | 14 | 1101 | 11 |
| 4 | 4 | 4 | 4 | 1111 | 15 | 1111 | 15 |

FIG. 11

MEMORY AND MEMORY ADDRESSING SYSTEM

BACKGROUND OF THE INVENTION

This invention relates to memory systems. More particularly it is concerned with random access memory systems in which the storage locations of the memory are addressed in different order during different memory addressing cycles.

In certain applications in which random access memory systems are employed it may be necessary to write data in the memory in one order and then to read the data out of the memory in a different order. One example of such a requirement is described in detail in application Ser. No. 502,933 filed concurrently herewith and entitled "TIME COMPRESSION SCANNER." In the time compression scanner described in the aforementioned application a multiplexer repeatedly samples a plurality of inputs in order during a first time period and the samples are converted to digital samples and stored in order as produced in a random access memory. The digital samples are not read out of the memory in the same order as stored, but all the samples associated with a single input are read out in order for each of the inputs in succession during a second time period.

A memory system for handling data in this manner may employ two memories each with the capacity for storing all the data presented during a single time period. The two memories operate in alternation, one storing data during a time period while the other is being read out. The sequence of write addresses and the sequence of read addresses differ from each other but are the same for both memories.

SUMMARY OF THE INVENTION

In a memory system in accordance with the present invention individual data storage locations of a memory are addressed in different order during each addressing period in a recurring sequence thereby permitting the use of single memory rather than two memories. The system includes a memory means having $2^{N+M}$ word storage locations, N and M each being integers. The memory means has N + M address inputs to permit addressing each of the word storage locations individually. The system also includes N + M flip-flop means arranged in order with each having an address output connected to a different one of the address inputs of the memory means. Each flip-flop means has a clock input connection and an output connection. The output connection of each of the flip-flop means is coupled to the clock input connection of the next flip-flop means in the order, with the output connection of the last flip-flop means in the order being coupled to the clock input connection of the first flip-flop means in the order.

The system includes a source of periodic clock pulses and a plurality of gating means each of which is connected between the source of periodic clock pulses and the clock input connection of a different one of the flip-flop means. A control means activates each of the gating means in a recurring sequence, thereby permiting the passage of clock pulses therethrough to the associated flip-flop means. Each of the gating means is activated for an address period of $2^{N+M}$ clock pulses. Thus, the word storage locations are addressed in a different order during each address period of a recurring sequence of address periods.

BRIEF DESCRIPTION OF THE DRAWINGS

Additional objects, features, and advantages of a memory system in accordance with the present invention will be apparent from the following detailed discussion together with the accompanying drawings wherein:

FIG. 9 is a table which is useful in explaining the operation of the memory system of FIG. 8;

FIG. 11 is a table which is useful in explaining the operation of the memory system of FIG. 10.

DETAILED DESCRIPTION OF THE INVENTION

General Description of Time Compression Scanner

Figure 1:
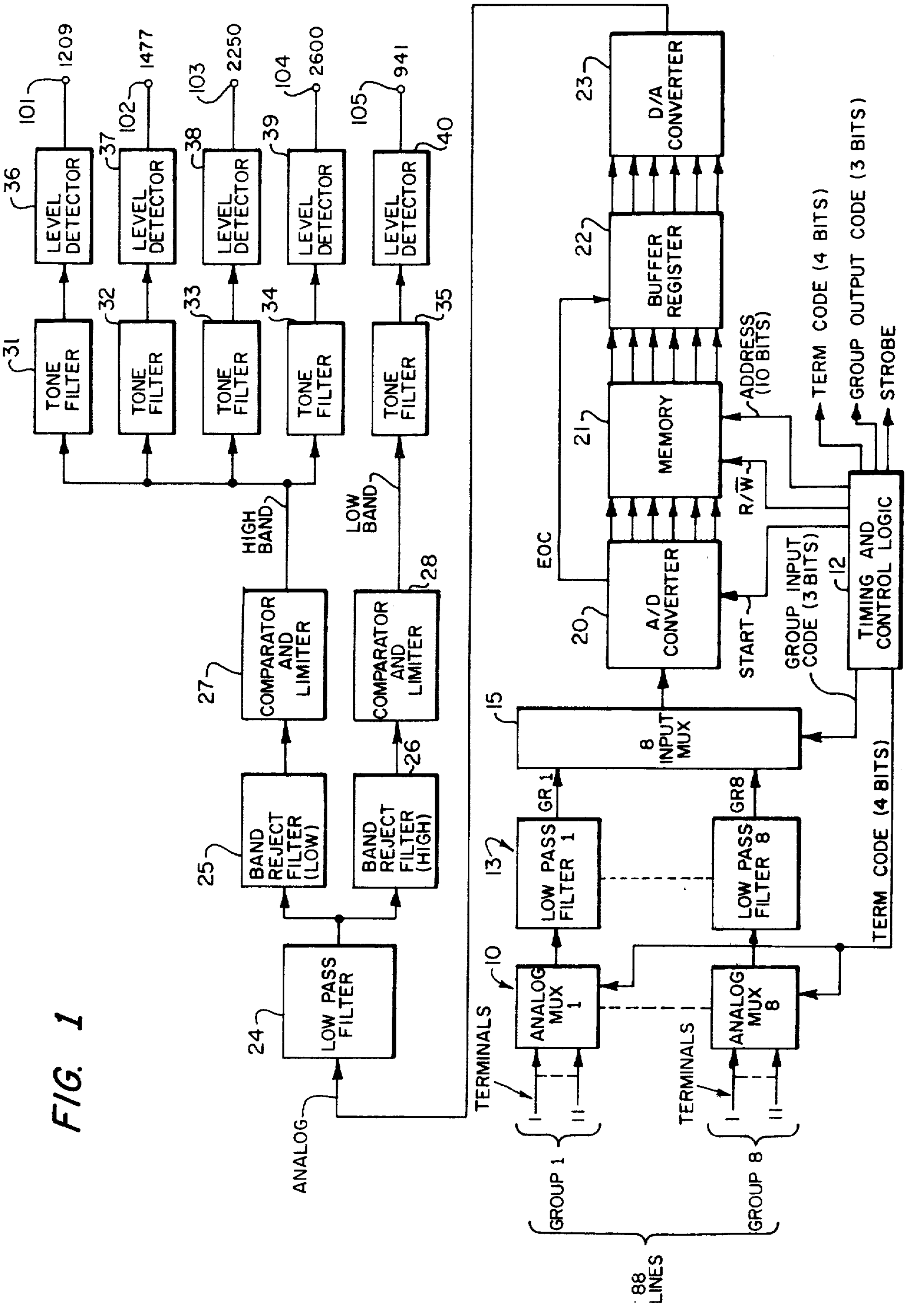
FIG. 1 is a block diagram of a time compression scanner employing the memory system of the present invention.

A time compression scanner which employs the memory system of the present invention is illustrated in the block diagram of FIG. 1. The time compression scanner in described in detail and claimed in the aforementioned application. For purposes of discussion a specific embodiment having particular parameters is described herein. In the particular specific embodiment under discussion the supervisory tones employed to signal for service are four high frequency tones of 1,209Hz, 1,477Hz, 2,250Hz, and 2,600Hz, and a low frequency tone of 941Hz. A signal for service present on a line consists of a single high frequency tone or a combination of the low frequency tone and a high frequency tone.

The scanner as illustrated in FIG. 1 monitors 88 incoming lines which are arranged in eight groups, each group containing 11 lines. As illustrated in FIG. 1 the lines of each group are connected to the 11 input terminals of one of eight analog multiplexers 1–8, 10. Under control of TERM CODE signals from the timing and control logic 12, analog multiplexers 1–8 operate in parallel, each continuously sampling its eleven input terminals. Each sampled portion of an input signal from the analog multiplexers 1–8 is applied to an associated one of low pass filters 1–8, 13.

The sampled portions from the low pass filters 1–8 are applied in parallel to an 8-input multiplexer 15. The multiplexer 15 operates under control of GROUP INPUT CODE signals from the timing and control logic 12 to repeatedly sample each of the sampled portions in sequence. Each sampled portion is sampled 128 times.

Each analog sample from the 8-input multiplexer 15 is converted to a 6-bit digital sample by an analog-to-digital converter 20. The analog-to-digital converter is controlled by a START signal from the timing and control logic 12. Under control of R/$\overline{W}$ and ADDRESS signals from the timing and control logic 12, the 6-bit samples are entered in a random access memory 21. By virtue of the sampling sequences of the analog multiplexers 1–8 and the 8-input multiplexer 15 the order in which the samples associated wih the first terminal of each group are entered into the memory is the first sample from each of the eight groups in order, then the second sample from each group in order, until the 128th sample from each group is entered.

The digital samples associated with the first terminal of each group are read out of the memory 21 under control of the R/$\overline{W}$ and ADDRESS signals from the timing and control logic 12. All of the samples associated with each group are read out for each group in turn. That is, the 128 samples associated with the first group are read out in order, followed by the 128 samples associated with the second group, and so on. Samples are read out at the same rate as samples are entered. Each 6-bit sample is entered in a buffer register 22 and is applied to a digital-to-analog converter 23. The digital-to-analog converter converts each digital sample to an analog pulse. The analog pulses are applied to a low pass filter 24 to produce a smooth, continuous analog signal. By virtue of the time compression provided by the apparatus, the frequencies present in the analog signal from the filter 24 are eight times the supervisory tone frequencies present on the incoming line with which the analog signal is associated.

The analog signal from the low pass filter 24 is applied to band reject filters 25 and 26. If one of the four high frequencies is present, it passes through a low band reject filter 25 to a comparator and limiter 27. If the low frequency is also present, it passes through a high band reject filter 26 to a comparator and limiter 28. The comparators insure that only signals above a predetermined threshold are accepted, and the limiters fix the amplitude of the signals.

Signals from the comparator and limiter 27 are applied to tone filters 31, 32, 33, and 34. The comparator and limiter 28 is connected to a tone filter 35. Each of the tone filters passes only a single frequency which is eight times one of the five supervisory tones. The high band pass filters 31, 32, 33 and 34 pass 9,672 Hz, 11,866 Hz, 18,000 Hz, and 20,800 Hz, respectively, and the low band pass filter 35 passes 7528 Hz.

The outputs of the tone filters 31, 32, 33, 34 and 35 are applied to level detectors 36, 37, 38, 39 and 40, respectively. In response to a frequency of suitable amplitude being applied thereto, a level detector produces a steady state output signal at its output terminal. The presence of an output signal from one of level detectors 36, 37, 38, or 39 at output terminal 101, 102, 103, or 104 indicates the presence of a supervisory tone of 1,209 Hz, 1,477 Hz, 2,250Hz, or 2,600 Hz, respectively, on the associated incoming line. Similarly, the presence of an output signal from level detector 40 at output terminal 105 indicates the presence of a supervisory tone of 941 Hz on the associated incoming line.

The timing and control logic 12 produces line identifying signals labelled GROUP OUTPUT CODE for identifying the particular group of incoming lines and TERM CODE for identifying the particular terminal of the group with which the output signals at output terminals 101, 102, 103, 104, and 105 are associated. A STROBE pulse is also produced by the timing and control logic 12 at a time which is subsequent to any possible delays in propagating data through the apparatus to the output terminals.

Additional details concerning the entering of data from the memory 21 into the buffer registers 22, the coverting of the digital data to ANALOG signals by the digital-to-analog converter 23, and the processing of the ANALOG signals to obtain the output signals at the output terminals 101–105 are provided in the aforementioned application.

Timing Section

Figure 2:
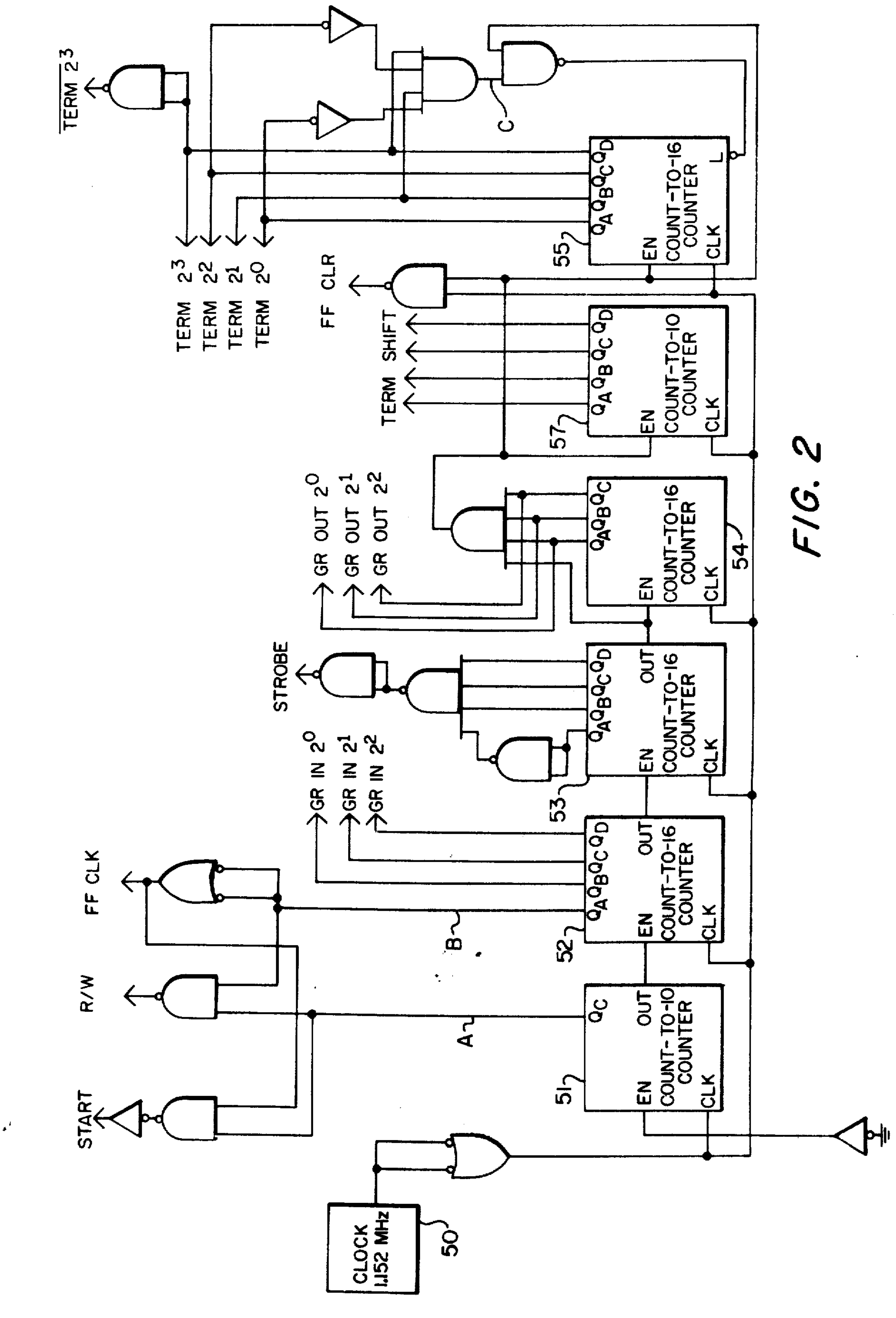
FIG. 2 is a logic diagram of the timing section of the scanner of FIG. 1.

The timing section of the timing and control logic is illustrated in the logic diagram of FIG. 2. Standard well-known symbols and notations are employed to designate various logic components. The timing and control signals for controlling the operation of the scanner are generated by the timing section. Certain of the signals produced in the timing section are shown in the timing diagrams of FIGS. 5A, 5B, and 5C. The timing train starts from a master oscillator 50 which produces squarewave clock pulses at the rate of 1.152 MHz. The squarewave pulses are applied to a series of counters including a count-to-10 counter 51, a count-to-16 counter 52, a second count-to-16 counter 53, a third count-to-16 counter 54, and a fourth count-to-16 counter 55 which is modified with appropriate logic to provide a count-to-11 counter.

Outputs labelled A and B (shown in FIG. 5A) are taken from stages in the count-to-10 counter 51 and the first count-to-16 counter 52 and combined to produce the START signal to the analog-to-digital converter 20 and the R/$\overline{W}$ signal to the memory 21. Output B is also used to produce FF CLK signal to the memory address control section. Signals labelled GR IN $2^0$, GR IN $2^1$, and GR IN $2^2$ are taken from the first count-to-16 counter 52 and applied to the 8-input multiplexer 15. These signals provide for operating portions of the scanner at the rate of 57.6 KHz establishing the basic data sampling period of 17.4 microseconds.

Figure 5A:
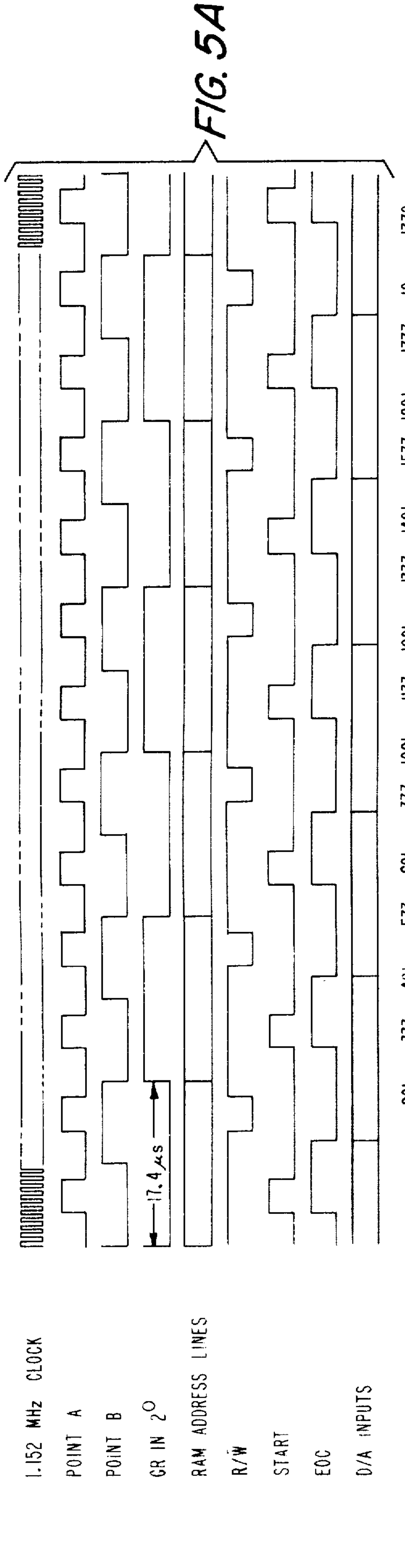
FIGS. 5A, 5B, and 5C are timing diagrams of signals generated within the scanner for controlling its operations.
Figure 5B:
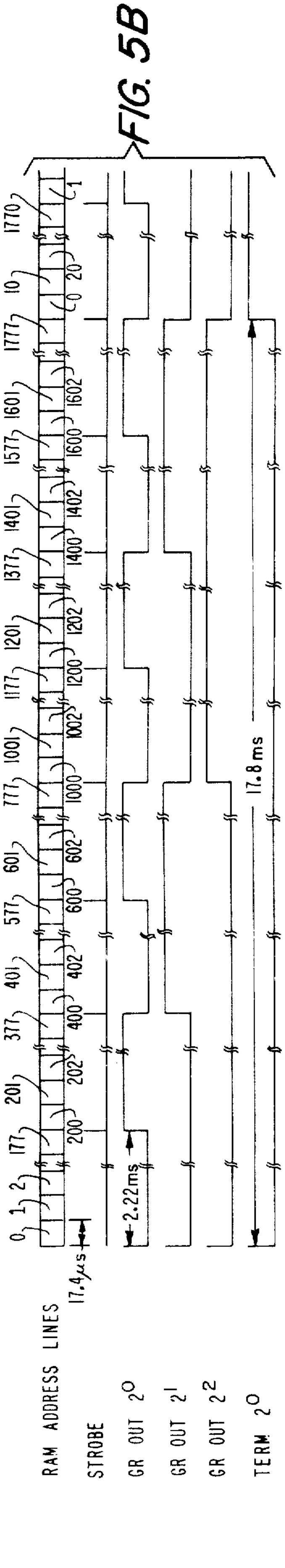

Outputs from the third count-to-16 counter 54 produce GR OUT $2^0$, GR OUT $2^1$, and GR OUT $2^2$ signals. These signals identify the originating group address associated with the data being presented at the outputs 101–105 (FIG. 1). The STROBE signal is produced from the second count-to-16 counter 53. The thrid count-to-16 counter 54 also generates FF CLR signals to the memory address control logic. As shown in FIG. 5B these signals establish a 2.22 millisecond period which is the period for reading out a set of data associated with a signal group, or a group readout period.

Figure 5C:
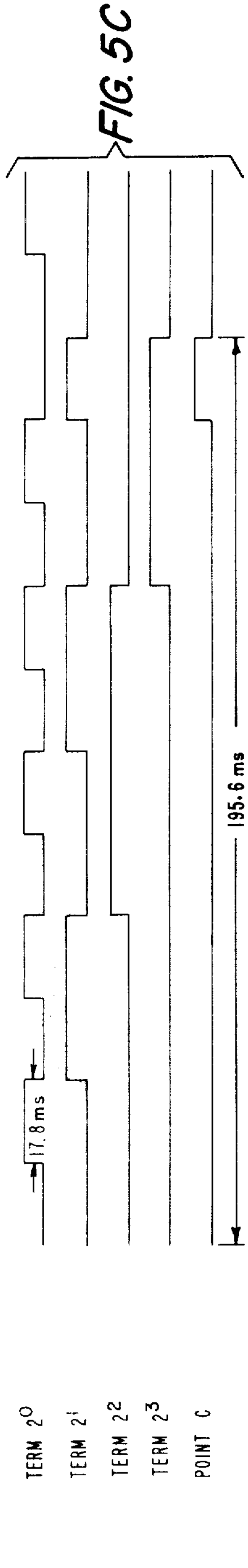

Outputs from the count-to-11 counter 55 provide TERM $2^0$, TERM $2^1$, TERM $2^2$, and TERM $2^3$ signals shown in FIG. 5C. These signals identify the terminal address, within the originating group associated with the data being presented at the outputs 101–105 (FIG. 1). In addition, these signals together with a $\overline{\text{TERM } 2^3}$ signal are applied to the input multiplexers 1–8. These signals establish a line or terminal sampling period of 17.8 milliseconds. Since the eleven terminals of each group are sampled sequentially by terminals and in parallel by groups, the total system scanning period is 195.6 milliseconds.

The timing section also includes a count-to-10 counter 57 which is coupled to the outputs from the third count-to-16 counter 54. The count labelled TERM SHIFT is taken from the stages of the count-to-10 counter 57 and applied to the memory address control logic. The count of the TERM SHIFT signal changes every 17.8 millisecond period; that is, at the same rate as the TERM CODE signals. However, the TERM SHIFT signals count through a recurring sequence of ten.

Memory and Memory Address Control

As illustrated in FIG. 1 the eighty-eight incoming lines are arranged in eight groups, each group containing 11 lines. The lines of each group are connected to the 11 input terminals of one of eight analog multiplexers 1–8, 10. Control signals TERM $2^0$, TERM $2^1$, TERM $2^2$, TERM $2^3$, and $\overline{\text{TERM } 2^3}$ (FIG. 5C) are applied to the multiplexers 1–8, 10 in parallel. These signals cause each multiplexer to step from one terminal to the next every 17.8 milliseconds. During each 17.8 millisecond dwell period sampled portions of the eight input signals to the multiplexers 1–8, 10 are taken and applied to the associated low pass filters 1–8, 13.

Figure 3:
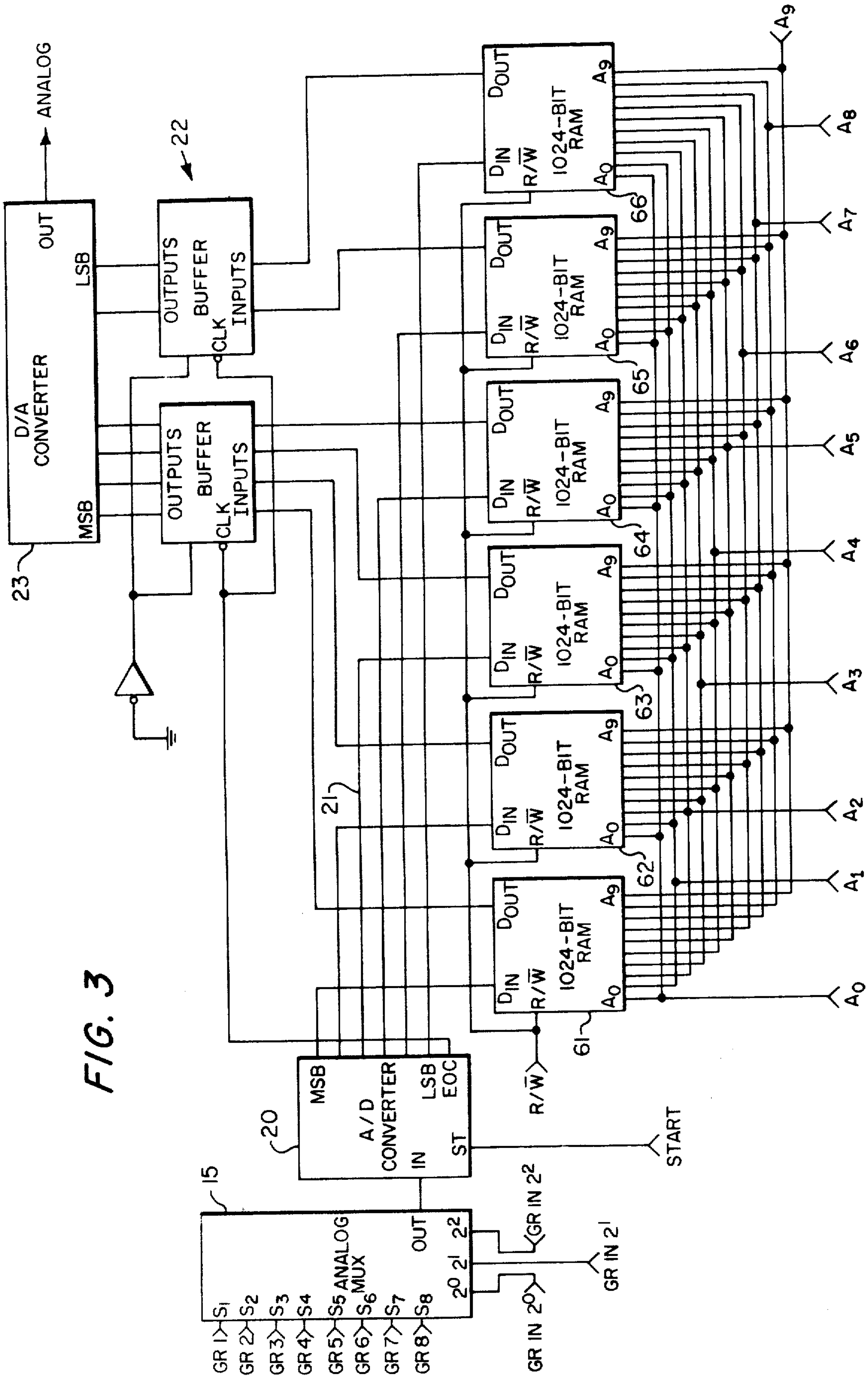
FIG. 3 is a logic diagram of a section of the scanner including a multiplexer, an analog-to-digital converter, a memory, and a digital-to-analog converter.

The sampled portions of the tones from the low pass filters 1–8 are applied in parallel as signals GR 1–8 to the 8-input multiplexer 15 as shown in FIG. 3. The multiplexer 15 is stepped through its eight input terminals by signals GR IN $2^0$, GR IN $2^1$ and GR IN $2^2$ from the timing section. (Only the GR IN $2^0$ signal is shown in FIG. 5A.) An analog sample is thus taken every 17.4 microsenconds, and the signal from each group is sampled every 139 microseconds. Thus, during a 17.8 millisecond terminal sampling period 128 analog samples are taken of each of the signals GR 1 – GR 8.

Every 17.4 microsecond period the multiplexer 15 applies an analog sample to the analog-to-digital converter 20. The analog-to-digital converter 20 is activated by a START signal from the timing section which, as shown in FIG. 5A, occurs a slight delay after the start of each 17.4 microsecond data sampling period. The analog-to-digital converter 20 converts each analog sample to a digital sample of 6 bits. The 6 bits are presented in parallel at its outputs.

The memory 21 as shown in FIG. 3 employs a set of six random access memories (RAMS) 61–66 for storing the six bits of each digital sample received from the analog-to-digital converter 20. The RAMS receive and read out the six bits of each sample in parallel and each receives identical control signals. Each RAM has storage locations for 1024 bits. Thus, the capacity of the entire memory 21 is 1024 6-bit digital samples, the number of samples produced during each 17.8 millisecond terminal sampling period. For purposes of discussion herein, each RAM is considered organized in an 8 × 128 storage location arrangement, and the addresses to the storage locations are expressed in octal base numbers.

The RAMS are controlled to write in or read out data by the $R/\overline{W}$ signal from the timing section (FIG. 2). The $R/\overline{W}$ signal as shown in FIG. 5A is repeated every 17.4 microsecond period with the "read" instruction preceding the "write" instruction. The addresses to individual storage locations of each of the RAMS is controlled by the ADDRESS signals $A_0$ – $A_9$. As shown in FIG. 5A the RAM addresses also change each 17.4 microsecond period.

Figure 4:
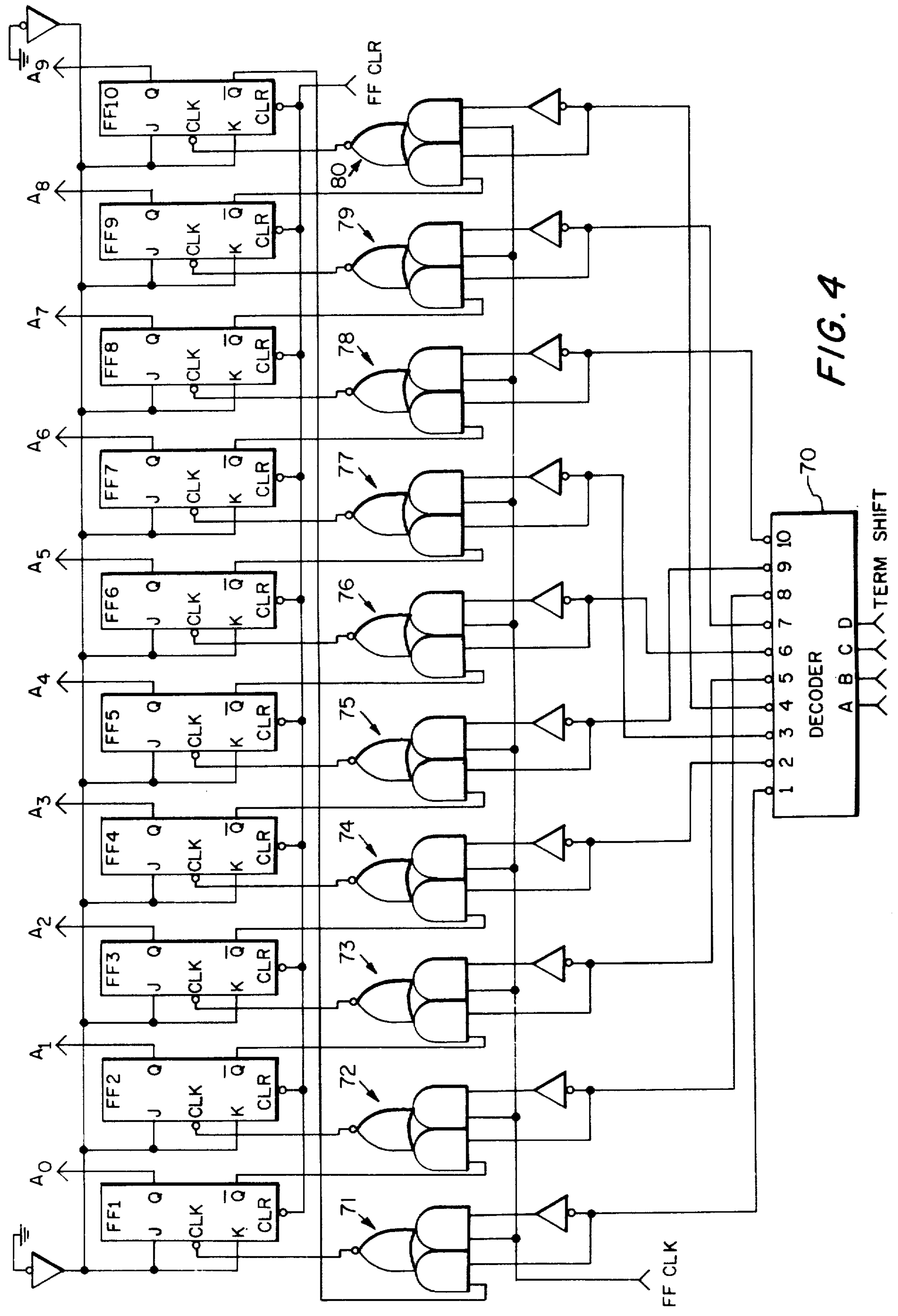
FIG. 4 is a logic diagram of the memory address control section of the scanner.

The RAM ADDRESS signals $A_0$–$A_9$ are controlled by the memory address control logic which is illustrated in FIG. 4. The memory address control logic includes a series of 10 flip-flops FF1 – FF10 arranged in recirculating order. The Q outputs of the flip-flops FF1 – FF10 provide the signals $A_0$ – $_{A9}$, respectively. The clock inputs to the flip-flops FF1 – FF10 are controlled through gating arrangements 71–80, respectively. The FF CLK signal, which is an inversion of the signal at point B of the timing section (FIG. 2) and is shown in FIG. 5A, is applied to all of the gaing arrangements. The FF CLK pulses pass through only one of the gating arrangements to its associated flip-flop as determined by control signals from a decoder 70. In addition, the clock input of each flip-flop is coupled to the $\overline{Q}$ output of the preceding flip-flop through a coupling gate in its gating arrangement. The clock input of the first flip-flop FF1 is coupled to the $\overline{Q}$ output of the last flip-flop FF10.

The decoder 70 decodes the count of the count-to-10 counter 57 of the timing section (FIG. 2) as indicated by the TERM SHIFT signals. The decoder 70 thus produces an output signal at one of its outputs 1–10, and the output signal shifts from one output to the next every 17.8 milliseconds in a recurring sequence. An FF CLR pulse is generated in the timing section (FIG. 2) at the end of each 17.8 millisecond terminal sampling period to clear all the flip-flops and reset them to an initial state.

Figure 6:
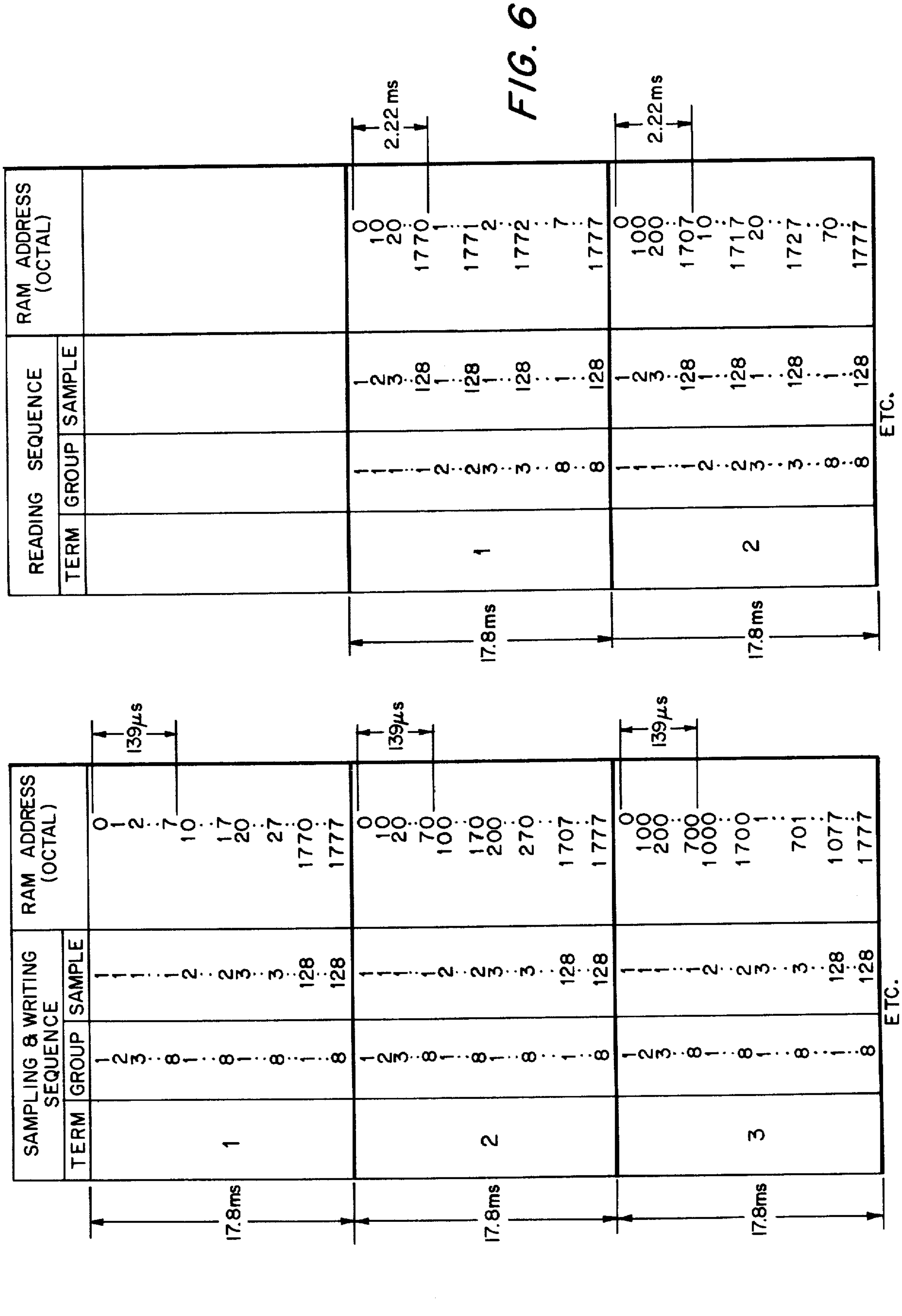
FIG. 6 is a table which is useful in explaining the sequence of operations of the scanner, in particular the writing in and reading out of data from the memory.

The sequence in which data must be written into and read out of the memory is indicated by the table of FIG. 6. As shown by the column labelled "Sampling and Writing Sequence" samples for the first terminals of each of the eight groups are obtained by sampling each of the eight groups in order repeatedly until 128 samples are obtained for each group. As shown by the column labelled "Reading Sequence," the order of reading out the data is different. The 128 samples of group 1 data are read out first, followed by the 128 samples of group 2 data, and so on in order by groups. To permit this sequence of operations all of the terminal 1 data is written into the memory during one terminal sampling period, and is read out during the next terminal sampling period while terminal 2 data is being collected.

The data could be handled in the foregoing manner by employing two memories which operate in alternation to store and read out data during subsequent terminal sampling periods. However, the memory and memory address control logic in accordance with the present invention as described herein permits the use of a single memory having the capacity for storing data pertaining to only a single terminal. As each stored sample is read out of the memory it is immediately replaced with another sample. Therefore, the storage locations of the memory must be addressed in a different order during each terminal sampling period, or memory addressing period.

Figure 7A:
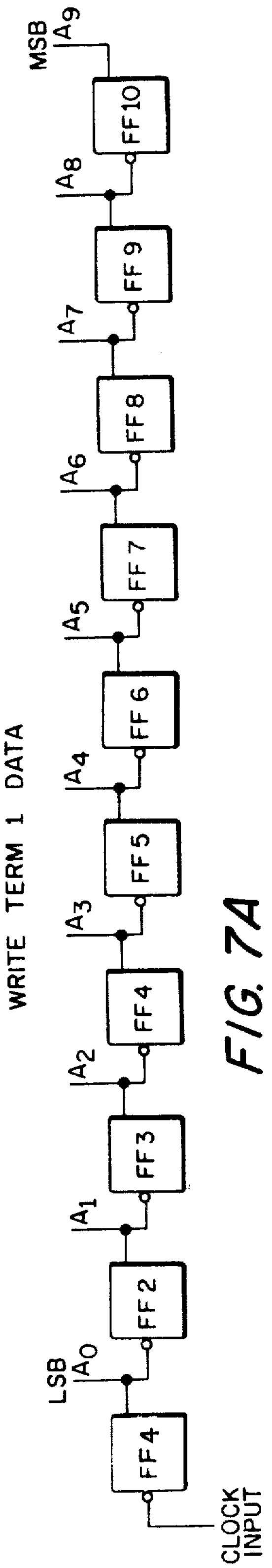
FIGS. 7A, 7B, 7C are simplified representations of a portion of the memory address control logic which are useful in explaining the sequence of operations of the scanner, and in particular the operation of the memory.
Figure 7B:
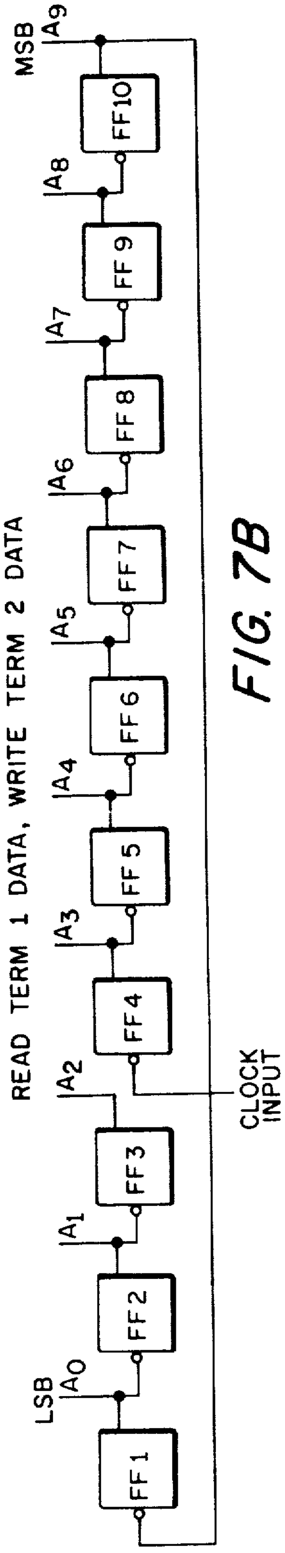
Figure 7C:
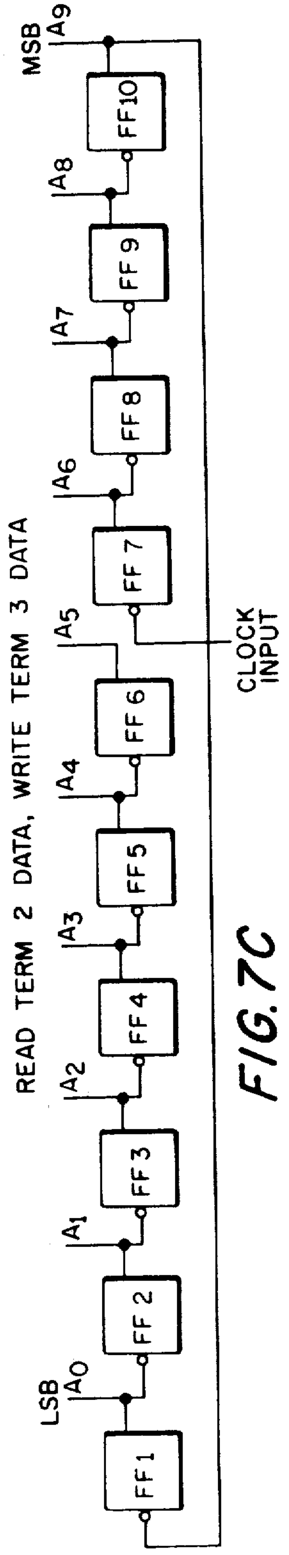

The sequence of addressing the RAMS so as to properly write in and read out data may best be understood from the table of FIG. 6 and the schematic representations of the flip-flops FF1 – FF10 in FIGs. 7A, 7B and 7C together with FIGS. 3 and 4 and the timing diagrams of FIGS. 5A, 5B, and 5C. It is assumed for purposes of discussion that the first terminals of the groups are being sampled during a terminal sampling period while the TERM SHIFT signal is causing the decoder 70 to produce a signal on its 1 output. Under these conditions only the gating arrangement 71 of the ten gating arrangements 71–80 is activated to permit FF CLK pulses to pass through and be applied to the clock input of its associated flip-flop FF1. In addition, gating arrangement 71 prevents signals from the $\overline{Q}$ output of flip-flop FF10 from being applied to the clock input of flip-flop FF1. In effect, the flip-flops become interconnected in the manner shown in FIG. 7A.

With the flip-flop associated as shown in FIG. 7A, the address outputs $A_0 - A_9$ count in order addressing every one of the 1024 storage locations in each of the RAMS in order as indicated by the RAM ADDRESS of the "Sampling and Writing Sequence" in FIg. 6. As shown in FIGS. 5A and 5B each RAM ADDRESS occurs over a 17.4 microsecond period. During each 17.4 microsecond period, the R/$\overline{W}$ signal (FIG. 5A) causes the digital sample stored at the address to be read out during the first portion of the data sampling period, and causes the digital sample from the analog-to-digital converter 20 to be written in at the same address during the last portion of the data sampling period.

During each group scanning period of 139 microseconds, a sample is taken from the first terminal of each group and stored in the memory. Upon completion of a 17.8 millisecond terminal sampling period, each group has been sampled 128 times and a total of 1,024 digital samples are stored in the RAMS at the addresses as indicated in FIG. 6.

After the data associated with the first terminal of each of the groups has been written in the memory during the first terminal sampling period or memory addressing period, the data must be read out in the order as indicated in the column "Reading Sequence" of FIg. 6 during the second terminal sampling period or memory addressing period. To read out the samples for a group, every eighth storage location of the RAMS must be addressed in sequence as shown in the RAM ADDRESS for the "Reading Sequence" in FIG. 6. During the second terminal sampling period, the TERM SHIFT signal for the count-to-10 counter 57 of the timing section (FIG. 2) changes and the output signal from the decoder 70 (FIG. 4) shifts from its 1 output to its 2 output. This signal activates the gating arrangement 74 associated with the fourth flip-flop FF4. Thus, the FF CLK pulses are routed to that flip-flop as illustrated in the schematic representation of FIG. 7B.

Under these conditions the count on the ADDRESS lines $A_0 - A_9$ steps by eight for each clock pulse, and every eighth storage location in the RAMS is read out in sequence until all the samples for a group have been read out. Thus, as shown in the "Reading Sequence" of FIG. 6 the RAMS are properly addressed to read out the data from all of the 1024 storage locations in the proper order. The 128 samples associated with a single group are read out in order during a group read out period of 2.22 milliseconds. The samples for all eight groups are read out in a memory addressing period of 17.8 milliseconds. During the data sampling periods of the same memory addressing period, as shown by the "Sampling and Writing Sequence" and associated RAM ADDRESS of FIG. 6, the terminal 2 data is being written into the memory at the same addresses.

Upon completion of the second 17.8 millisecond terminal sampling period or memory addressing period all of the terminal 1 data has been read out of the memory and processed and has been replaced by terminal 2 data. During the third terminal sampling period when the terminal 2 data is read out of the memory and terminal 3 data is written in as shown in FIG. 6, the decoder 70 produces a signal at its 3 output. This signal activates the gating arrangement 77 associated with the seventh flip-flop FF7 and the FF CLK pulses are directed to its clock input as shown in FIG. 7C. Thus, during the third terminal sampling period every sixty-fourth storage location in the RAMS is addressed in sequence until all the samples for a group have been read out causing the terminal 2 data to be read out in the proper order as shown in FIG. 6.

Processing of data into and out of the memory continues in this manner with the FF CLK pulses being stepped by three flip-flops during subsequent terminal sampling periods in recirculating order. Since, in this particular embodiment, eleven terminal sampling periods are required to scan the complete system and there are only ten address lines and flip flops, the system scanning cycle and a complete sequence of memory addressing cycles overlap. Thus, on the next system scanning cycle while the previously stored terminal 11 data is being read out and terminal 1 data is being written, the FF CLK pulses are directed to the fourth flip-flop FF4 as in FIG. 7B. However, although the cycles are out of phase they are independent and data will be properly stored and read out for each terminal sampling period of each system scanning period.

Modifications of Memory and Memory Address Control

Figure 8:
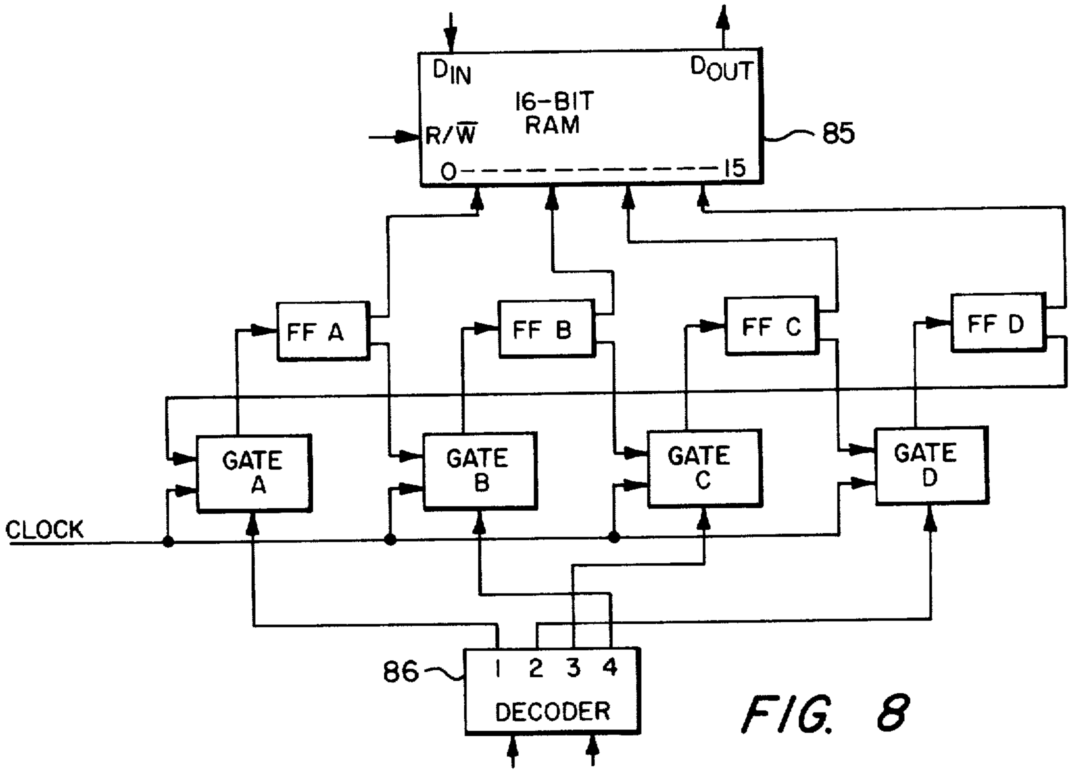
FIG. 8 is a simplified schematic representation of a modification of a memory and memory address control logic in accordance with the present invention.

A representation of a modified memory system is illustrated in FIG. 8. The system shown is very simple in order to simplify the explanation of its operation and clearly demonstrate the principles involved in memory systems in accordance with the invention. The elements are similar to those of FIGS. 3 and 4. The system includes a single 16-bit RAM 85 for storing 16 single bit words. (The term "word" is equivalent to "sample" in the previous discussion). There are 16 addresses to word locations and, therefore, four address lines are required. The address lines are output connections from four flip-flops FFA-FFD arranged in order. Four gating arrangements gate A – gate D are also provided, one associated with each of the flip-flops. The output of each gate is connected to the clock input of its associated flip-flop, and an output of each flip-flop is connected to an input of the following gate in the order. The output of the last flip-flop FFD in the order is connected to the input of the first gate A. Clock pulses are applied to the clock input of each of the gates A-D.

A decoder 86 has two input connections and four output connections 1, 2, 3, and 4. The input connections are connected to a counter of the timing section as in FIGS. 2 and 4. Output 1 is connected to gate A, output 2 to gate D, output 3 to gate C, and output 4 to gate B. Output signals occur at one of the four outputs of the decoder to activate the associated gate as determined by the combination of signals at the decoder input.

The memory system has capacity of 16 signal bit words and is arranged to process eight sets of two words each. (The term "set" is the equivalent to "group" in the previous discussion.) That is, during a memory addressing period of sixteen clock pulses the memory stores a first word of each of the eight sets and then the second word of each of the eight sets. Also during a memory addressing period the two words of eight sets of words are read out in order by sets. (A "memory addressing period" is equivalent to a "terminal sampling period" in the previous discussion as regards the functioning of the memory.)

A period of sixteen clock pulses is a memory addressing period during which each of the word locations of the memory is addressed in a particular order depending on which of the flip-flops FFA-FFD receives the clock pulses at its clock input. The clock pulses pass through whichever one of gates A-D is activated by an output from the decoder 86. After each memory addressing period the input to the decoder 86 changes. During a complete sequence of four memory addressing periods the gates are activated in order A, D, C, and B. That is, during a memory addressing period, the clock pulses are applied to the flip-flop which is third in order from the flip-flop receiving clock pulses during the previous memory addressing period.

The manner of operation of the memory system of FIG. 8 throughout a complete sequence of four memory addressing periods is illustrated in detail in the table of FIG. 9. During the first addressing period the clock pulses are applied to the first flip-flop FFA by virtue of gate A being activated by a signal at output 1 of the decoder 86. The flip-flops start in initial states and count by ones in response to clock pulses as shown in the table. The count of the flip-flops designates the addressed word location in the memory. A decimal equivalent value for each of the addresses is also shown in the table. The column labelled "write in" indicates the order in which data is presented to the memory, and the addresses where it is stored during the first memory addressing period is shown in the appropriate column.

Upon completion of the first memory addressing period the signal at the input of the decoder 86 changes, and the output signal from the decoder 86 changes to output 2. Also at the end of the memory addressing period the flip-flops are reset to their initial states. The output signal from the decoder 86 activates gate D so that during the second memory addressing period the clock pulses are directed to flip-flop FFD. Thus, during the second memory addressing period the flip-flops change states for each clock pulse in the sequence shown in the appropriate column of the table of FIG. 9. As indicated by the column labelled "read out" this sequence of addresses causes the data written into the memory during the first address period to be read out in the proper order with all of the words for each set being read out in order for each set in order. At the same time, ad indicated by the column labelled "write-in" new data is being written into the same word locations from which the previously entered data is being read out.

During the third address period gate C is activated directing the clock pulses to flip-flop FFC and causing the flip-flop states to change on each clock pulse in the sequence as shown in the appropriate column. Thus, data written into the memory as indicated in the "write in" column during the second memory addressing period is read out as indicated in the "read out" column during the third memory adressing period. Also, new data is written in at the addresses indicated.

During the fourth address period gate B is activated causing the clock pulses to be applied to flip-flop FFB. Under these conditions the memory word locations are addressed in the order shown in the appropriate column of the table causing data to be read out in proper order as shown in the "read out" column and new data to be written in as shown in "write in" column.

Upon completion of the fourth memory addressing period a new sequence starts with a first memory addressing period. The sequences of memory addressing periods continue in a recurring manner reading out data entered during the previous period and writing in new data. The memory locations are addressed in a different order during each of the memory addressing period of a recurring sequence so that data is always read out in the same relationship to the order in which it was entered.

Figure 10:
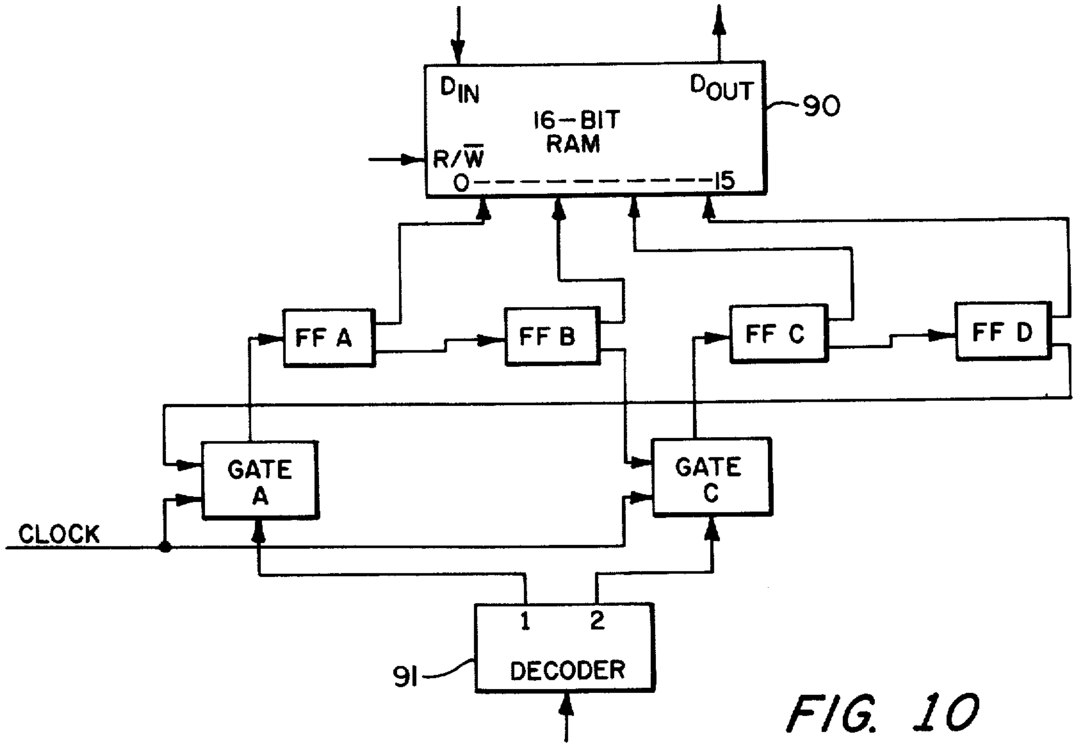
FIG. 10 is a simplified schematic representation of another modification of a memory and memory address control logic arrangement in accordance with the present invention.

Another modification of a memory system in accordance with the invention is illustrated in FIG. 10. This system also employs a single 16-bit RAM 90 and four flip-flops FFA-FFD. In this modification only two gating arrangements, gate A and gate C are required and are associated with flip-flops, FFA and FFC, respectively. The flip-flops are connected in order as shown. An output of flip-flop FFA is connected directly to the clock input of flip-flop FFB and an output of flip-flop FFC is connected directly to the clock input of flip-flop FFD. A decoder 91 has a single input connection and two output connections "1" and "2" connected to gate A and gate C, respectively.

The detailed operation of the memory system of FIG. 10 is illustrated by the table of FIG. 11. The system of FIG. 10 processes sixteen words arranged in four sets of four words each. Thus, data is written into the memory and read out as shown in the column of the table labelled "write in" and "read out".

During the first address period of a sequence the decoder 91 produces an output at its 1 output activating gate A and directing the clock pulses to flip-flop FFA. As shown in the appropriate column of the table the word location addresses as determined by the flop-flop states change in direct order through each word location of the memory.

During the second memory addressing period during when the decoder output signal is present on output 2, gate C is activated and the clock pulses are directed to flip-flop FFC. The resulting sequence of addresses is shown in the appropriate column of the table. The data written in during the previous memory addressing period is thus read out in the proper order as shown in the column labelled "read out." New data is also written into the memory at the same addresses.

Since in this modification during a memory addressing period the clock pulses are applied to the second flip-flop in the order from the flip-flop which received the clock pulses during the previous period, there are only two memory addressing periods in a complete sequence. Therefore, only two gates A and C are required and clock pulses are never applied directly to flip-flops FFB and FFD.

In summary, it can be seen that the memory and memory control systems in accordance with the invention as shown in FIGS. 3 and 4 and also in FIGS. 8 and 10 require a memory storage capacity which is one-half that required by two memories operating in alternation. In order for a memory system in accordance with the invention to operate in continuously recurring sequences as shown, the number of sets (groups) of words (samples) must be a power of 2, this requirement may be expressed as $2^M$ where M is an integer. In addition, the number of words (samples) per set (group) must also be a power of 2, which may be expressed as $2^N$ where N is a integer. Thus, a total of $2^{N+M}$ word (sample) storage locations must be provided by the memory with a like number of addresses produced by N+M flip-flops. The number of gating arrangements required depends upon the particular organization of sets and words, as demonstrated by the systems shown in FIGS. 8 and 10. In any event, clock pulses must be gated to the flip-flops in a recirculating order which advances every Mth flip-flop for each memory addressing period. Stepping continues every memory addressing period in a continuous series of recurring sequences of memory addressing periods.

Thus, while there has been shown and described what are considered preferred embodiments of the present invention it will be obvious to those skilled in the art that various changes and modifications may be made therein without departing from the invention as defined by the appended claims.

What is claimed is:

1. Memory system in which word storage locations are addressed in different order during each address period in a recurring sequence of address periods including memory means having $2^{N+M}$ word storage locations, wherein N and M are each integers, said memory means having N+M address inputs;

N+M flip-flop means arranged in order each having an address output connected to a different one of the address inputs of the memory means and each having a clock input connection;

each flip-flop means having an output connection coupled to the clock input connection of the next flip-flop means in the order, with the output connection of the last flip-flop means in the order being coupled to the clock input connection of the first flip-flop means in the order;

a source of periodic clock pulses;

a plurality of gating means each being connected between said source of periodic clock pulses and the clock input connection of a different one of said flip-flop means; and control means for activating each of said gating means in a recurring sequence to permit the passage of clock pulses therethrough to its associated flip-flop means, each gating means being activated for an address period of $2^{N+M}$ clock pulses, whereby the word storage locations are addressed in a different order during each address period of a recurring sequence of address periods.

2. A memory system in accordance with claim 1 wherein said control means activates said gating means in a recurring sequence causing the gating means to permit the first flip-flop means in the order to receive clock pulses during the first address period of each sequence, and during each subsequent address period of the sequence to permit the Mth flip-flop means in recirculating order from the flip-flop means which received clock pulses during the preceding address period to receive clock pulses.

3. A memory system in accordance with claim 2 wherein said control means includes counter means coupled to said source of periodic clock pulses and operable to produce a different combination of output signals during each address period of a recurring sequence of address periods; and decoder means connected to the counter means and to the gating means and being operable to activate a different one of the gating means during each address period of a recurring sequence of address periods as determined by the output signals from the counter means.

4. A memory system in accordance with claim 3 including reset means coupled between the counter means and the flip-flop means and operable upon completion of each address period to reset all the flip-flop means to an initial state.

5. A memory system in accordance with claim 4 wherein each of said gating means includes a coupling gate connected between the clock input connection of its associated flip-flop means and the output connection of the preceding flip-flop means in the order, the coupling gate associated with the first flip-flop means in the order being connected to the output connection of the last flip-flop means in the order, each of said coupling gates being connected to said decoder means; and said decoder means when activating a gating means being operable to prevent the coupling gate of that gating means from passing signals from the output connection to the clock input connection to which it is connected, and when not activating a gating means being operable to permit the coupling gate of that gating means to pass signals from the output connection to the clock input connection to which it is connected.

* * * * *